United States Patent [19]
Itoh

[11] Patent Number: 4,952,202
[45] Date of Patent: Aug. 28, 1990

[54] APPARATUS FOR PRODUCING TUBE
[75] Inventor: Tomio Itoh, Kawanishi, Japan
[73] Assignee: Mitsuya Tekko Co., Ltd., Osaka, Japan
[21] Appl. No.: 311,451
[22] Filed: Feb. 16, 1989
[30] Foreign Application Priority Data
  May 26, 1988 [JP] Japan .................................. 63-128872
[51] Int. Cl.⁵ .............................................. B31C 1/00
[52] U.S. Cl. ..................................... 493/299; 156/431
[58] Field of Search ....................... 493/298, 299, 300; 156/195, 428, 429, 430, 431

[56] References Cited
U.S. PATENT DOCUMENTS

| | | | |
|---|---|---|---|
| 507,764 | 10/1893 | Spengler | 493/299 |
| 1,374,318 | 4/1921 | Parker | 493/271 |
| 2,723,605 | 11/1955 | Stahl | 493/299 |
| 2,812,007 | 11/1957 | Touchett et al. | 493/299 |
| 3,068,934 | 12/1962 | Mauck et al. | 493/299 |
| 3,567,101 | 3/1971 | Ranne | 493/299 |
| 4,113,546 | 9/1978 | Anders | 156/431 |
| 4,300,963 | 11/1981 | Berg | 493/297 |
| 4,341,523 | 7/1982 | Ikuta | 493/299 |

Primary Examiner—William E. Terrell
Attorney, Agent, or Firm—Klauber & Jackson

[57] ABSTRACT

An apparatus for producing a paper tube or like tube at a constant speed by helically winding tape on a mandrel tightly with a great torsional force without creating any tape-to-tape clearance and delivering the tube formed from the mandrel axially thereof with a great force while rotating the tube without warping the mandrel. The apparatus comprises tape feeders, the mandrel and a tube rotating-drawing device for delivering the tube from the mandrel axially thereof while rotating the tube. When required, other devices can be provided for the apparatus which include a tape winding device and a tube press which are interposed between the tape feeders and the tube rotating-drawing device, and a resin-coated tape feeder, resin applicator stand, drying oven, grinding stand and tube cutter which are arranged downstream from the tube rotating-drawing device.

10 Claims, 7 Drawing Sheets

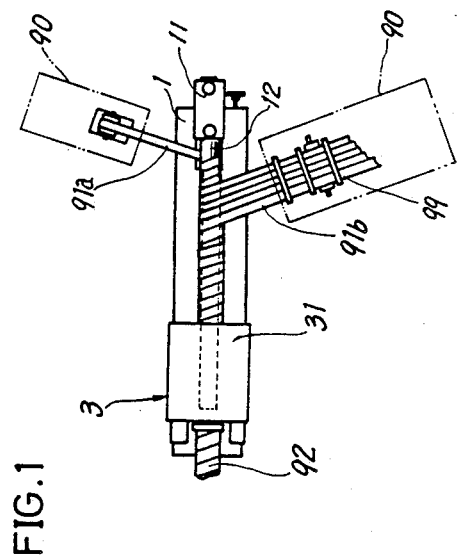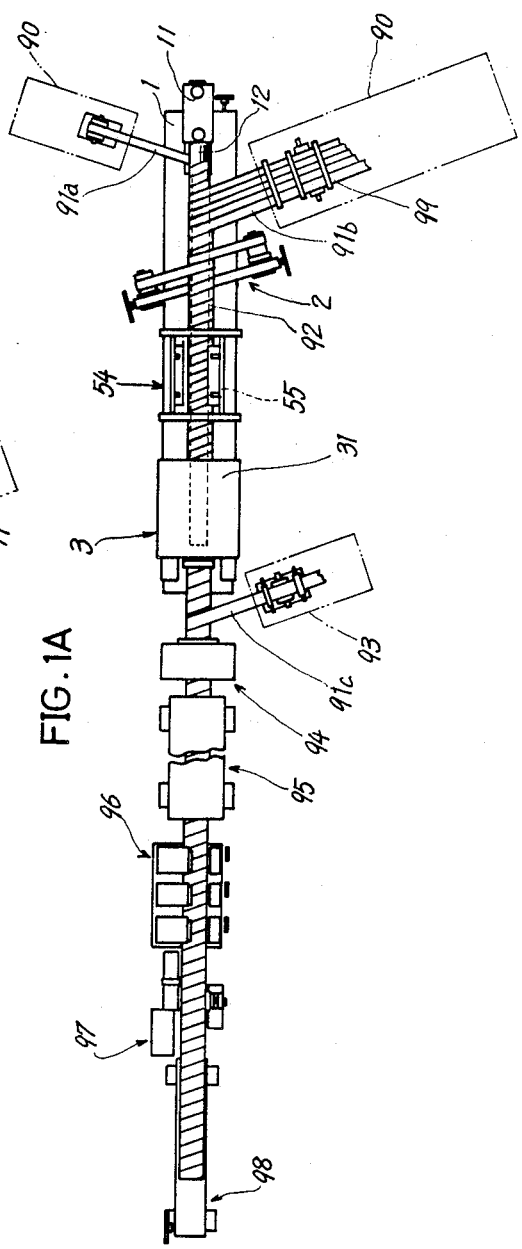

APPARATUS FOR PRODUCING TUBE

FIELD OF INDUSTRIAL APPLICATION

The present invention relates to an apparatus for producing a tube by helically winding tape on a mandrel.

BACKGROUND OF THE INVENTION

Cores or paper tubes are produced generally by helically winding paper tape in layers around a mandrel in the form of a round rod to form a tubular body and continuously delivering the tubular body from the forward end of the mandrel. Two-pulley and three-pulley devices shown in FIGS. 12 and 13, respectively, are conventionally used for winding paper tape around the mandrel.

The tape winding device 2 shown in FIG. 12 has two rotatable pulleys 13, 13 arranged on opposite sides of a mandrel 12. A belt 29 obliquely wound on the mandrel 12 by one turn is endlessly reeved around the two pulleys 13, 13.

The tape winding three-pulley device 2 shown in FIG. 13 comprises one main rotatable pulley 13 disposed on one side of a mandrel 12, and first and second two auxiliary rotatable pulleys 13a, 13b arranged on the other side of the mandrel. A first belt 29 is endlessly reeved around the upper portion of the main pulley 13 and the first auxiliary pulley 13a, and a second belt 29a is endlessly wound around the lower portion of the main pulley 13 and the second auxiliary pulley 13b. The first and second belts 29, 29a are wound on the mandrel 12 by one turn symmetrically.

With these two-pulley and three-pulley devices, paper tapes 91a, 91b paid off from two tape feeders 90, 90, respectively, are engaged between the mandrel 12 and the belt 29 or belts 29, 29a driven by the pulleys and helically wound on the mandrel 12 into a paper tube 92 while being slipped on the mandrel by the friction between the tape and the belt. Thus, the belt or belts function to wind the paper tapes around the mandrel and also to forward the paper tube axially thereof.

However, when the belt is tensioned as wound around a mandrel of small diameter as stated above and is driven in this state at a high speed for producing a paper tube of small diameter, the mandrel of small diameter warps in an undulating fashion, rendering the paper tube no longer smoothly rotatable and movable axially thereof and making it impossible to obtain a paper tube of commercial value. With the conventional paper tape winding device, therefore, there arises a need to lower the tension on the belt and to drive the belt at a reduced speed. Consequently, when producing a paper tube, for example, having a small inside diameter of 6 mm and a wall thickness of 2 mm, the device is as low as about 2 m/min in production speed and is very low in production efficiency.

Further regardless of whether paper tubes have a small diameter, medium wall thickness or large wall thickness, those for a particular use are required of very high pressure resistance. To impart improved pressure resistance to the paper tube, the paper tape must be subjected to great back tension and tightly wound on the mandrel. Nevertheless, if the belt wound on the mandrel by one turn is driven to wind the paper tape around the mandrel and also to forward the resulting paper tube as in the conventional practice, slippage is likely to occur between the paper tube and the tape, whereas increased back tension on the paper tape permits slippage of the belt. Since the torque of the pulley is transmitted to the tape by virtue of the friction between the pulley and the belt and also the friction between the belt and the tape, the power transmission efficiency is low. Consequently, even if an increased torque is given to the pulley, difficulty is encountered in winding the highly tensioned tape around the mandrel helically continuously. Thus, it is difficult to produce paper tubes having the desired pressure resistance.

Further when the belt is driven as wound on the mandrel obliquely, the belt acts to advance axially of the mandrel at the portion thereof around the mandrel, while the tension on the belt retracts the belt axially of the mandrel. Since this motion is repeated, the belt is always reciprocatingly moved over a small distance axially of the mandrel. Because the paper tape is wound on the mandrel by the belt reciprocatingly moving in this fashion, a clearance is liable to occur between the adjacent two portions of the tape wound on the mandrel. Such a clearance not only impairs the strength of the paper tube but also varies the speed of axial transport of the tube.

Before the paper tube is made into a finished product, the tube is not infrequently subjected to aftertreatments such as coating of the tube surface with resin and grinding of the resulting surface. However, the conventional machine for producing paper tubes is low in its force to deliver the paper tube axially thereof, so that such aftertreatments offer increased resistance to the axial movement of the tube to result in variations in the speed of axial movement of the tube and make the tube production speed unstable, if the treatments are conducted in sequence by devices connected to the production line downstream from the machine. Consequently, the aftertreatment devices are not in smooth operative relation with the machine, failing to produce products of good quality. With the conventional device, therefore, the paper tube is cut to a specified length, and the cut tube is then treated as required by another processing line, hence a poor production efficiency.

SUMMARY OF THE INVENTION

The main object of the present invention is to provide an apparatus for producing a paper tube or like tube at a constant speed which apparatus is adapted to deliver the tube axially thereof with a great force while rotating the tube without warping the mandrel so that tape can be helically wound on the mandrel tightly with a great torsional force without creating any tape-to-tape clearance.

To fulfill the above object, the present invention provides an apparatus for producing a tube which comprises a tube rotating-drawing device in place of or in addition to a conventional tape winding device. The tube rotating-drawing device comprises a rotary frame coupled to rotary drive means and rotatable in a fixed position around a mandrel, support members provided on the rotary frame with the mandrel positioned between the support members and movable toward or away from the mandrel, means for pressing the support members against the mandrel, and a delivery assembly mounted on each of the support members and having a delivery member coupled to delivery drive means and movable along an endless path or rotatable in a plane containing the axis of the mandrel for delivering the tube formed on the mandrel axially thereof by frictional contact of the delivery member with the tube on the mandrel.

BRIEF DESCRIPTION OF THE DRAWINGS

FIG. 1 is a plan view of an apparatus of the invention for producing a paper tube;

FIG. 1A is a plan view showing a paper tube production line embodying the invention;

DETAILED DESCRIPTION OF EMBODIMENTS

Figure 2:
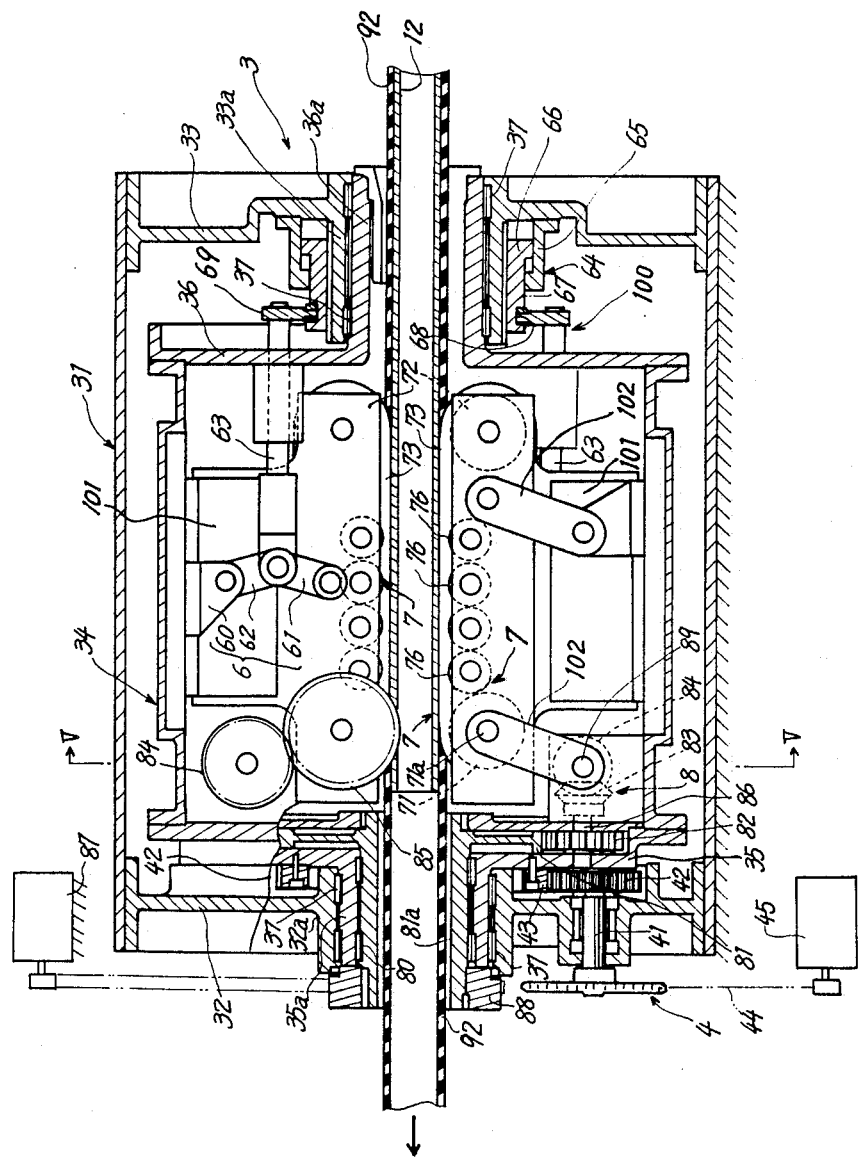
FIG. 2 is a sectional view of a tube rotating-drawing device.

Although the invention will be described below with reference to the case wherein paper tape is used for making a paper tube, the invention is not limited to the use of paper but is of course useful for forming tape of nonwoven fabric, synthetic resin or the like for forming tubes.

With reference to FIG. 1, the paper tube production apparatus of the invention comprises a mandrel 12 horizontally disposed on a base 1 and fixed at its one end to the base, a pair of paper tape feeders 90, 90 arranged at the respective sides of the base 1, and a tube rotating-drawing device 3.

The apparatus of the invention can be selectively equipped with various devices in accordance with the size of paper tube to be produced, the characteristics required of the tube, the desired production efficiency, etc. FIG. 1A shows an example of paper tube production line including various devices, i.e., a tube press 54 and a tape winding device 2 which are arranged upstream from the tube rotating-drawing device 3; and a resin-coated tape feeder 93, resin applicator stand 94, drying oven 95, grinding stand 96, tube cutter 97 and tube support 98 which are arranged downstream from the tube rotating-drawing device 3. Such components can be selected as desired for use in combination with the paper tube production apparatus of FIG. 1.

The terms "front" and "rear" as used herein refer respectively to the downstream side and the upstream side of the production line.

The mandrel 12 extends horizontally toward the front and is supported by a bracket 11 at the rear end of the base 1. The front end of the mandrel is left unsupported.

Paper tape feed means preferably comprises two feeders, i.e., the above-mentioned tape feeders 90, 90 which are arranged at the respective sides of the base 1. A paper tape 91a for forming the lowermost layer of a core or paper tube 92 is obliquely fed to the mandrel 12 from one of the feeders 90. The paper tape 91a is coated on the rear surface thereof with paraffin to reduce the friction between the tape and the mandrel 12. A plurality of paper tapes 91b lapping over one another at the side edge are fed obliquely to the mandrel 12 from the other feeder 90. A glue is applied to the rear surface of each tape 91b by an applicator 99.

The number of tape feeders is not limited to two but the tapes 91a, 91b can be supplied from a single feeder, or three or more feeders.

The tube rotating-drawing device 3 has a fixed frame 31 in the form of a hollow cylinder and mounted horizontally on the base 1 concentrically with the mandrel 12. The mandrel 12 extends through a boss 33a on a rear end plate 33, with a clearance formed around the mandrel, and has its front end positioned close to a boss 32a on a front end plate 32.

A rotary frame 34 in the form of a hollow cylinder is housed in the fixed frame 31 rotatably and concentrically with the mandrel 12. Central bosses 35a, 36a on opposite end plates 35, 36 of the rotary frame 34 are rotatably supported by bearings 37, 37 on the bosses 32a, 33a of the fixed frame 31. Thus, the rotary frame 34 is free to rotate within the fixed frame 31.

Rotary drive means 4 mounted on the fixed frame 31 is coupled to the rotary frame 34 to drivingly rotate the frame 34. The drive means 4 includes a shaft 41 rotatably extending through the front end plate 32 of the fixed frame 31 and coupled at its outer end to a motor 45 by a chain 44. A pinion 42 is mounted on the inner end of the shaft 41. The motor 45 and a motor 26 (FIG. 6) for the tape winding device 2 are coupled to a rotation control unit (not shown) of the inverter type, whereby the speed of rotation of the rotary frame 34 is variable in accordance with the speed of travel of a belt 29 of the tape winding device 2.

An annular large gear 43 secured to the front end plate 35 of the rotary frame 34 concentrically with the mandrel 12 is in mesh with the pinion 42.

Figure 3:
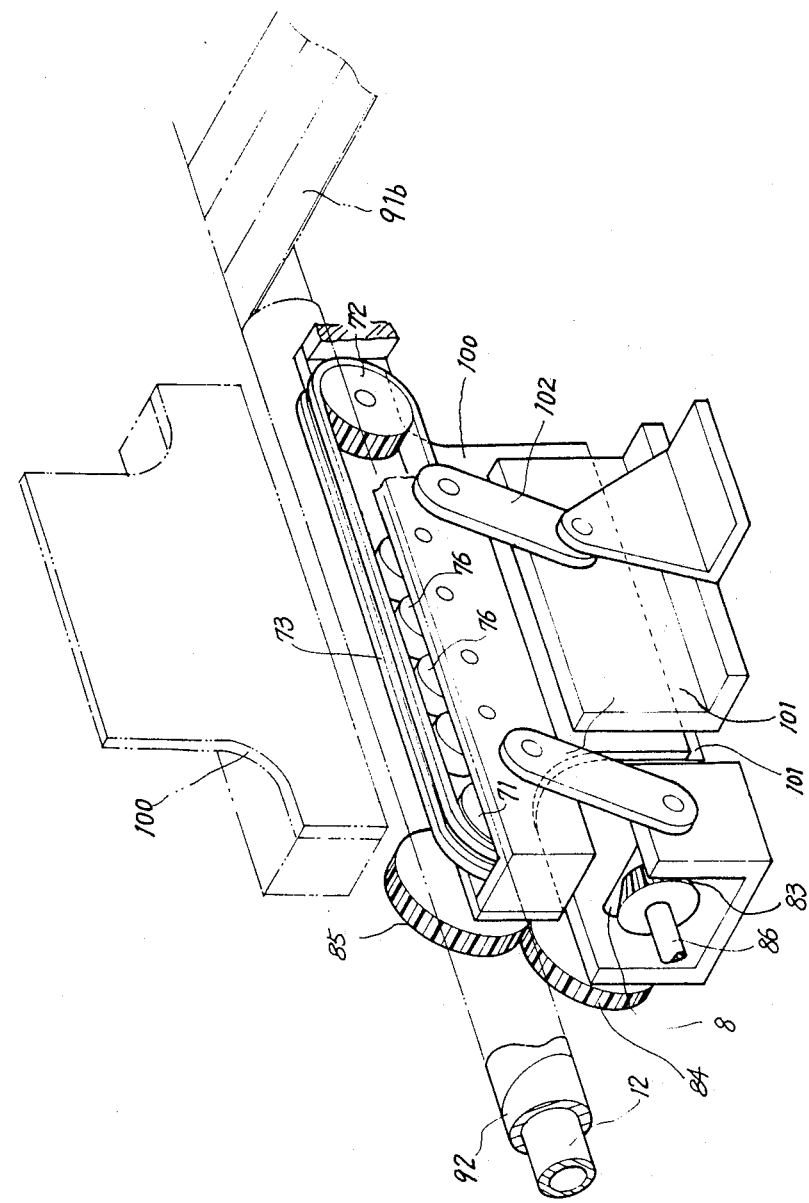
FIG. 3 is a perspective view of a delivery assembly.

As seen in FIGS. 2 and 3, a pair of support members 100, 100 are opposed to each other inside the rotary frame 34, with the mandrel 12 interposed therebetween.

Each support member 100 is slidably supported as held between a pair of guide plates 101, 101 secured to the inner surface of the rotary frame 34 and is movable forward and rearward, and also toward or away from the mandrel 12. The support member 100 is supported at its front and rear portions by parallel levers 102, 102 on the rotary frame 34 forwardly and rearwardly movably.

Figure 4:
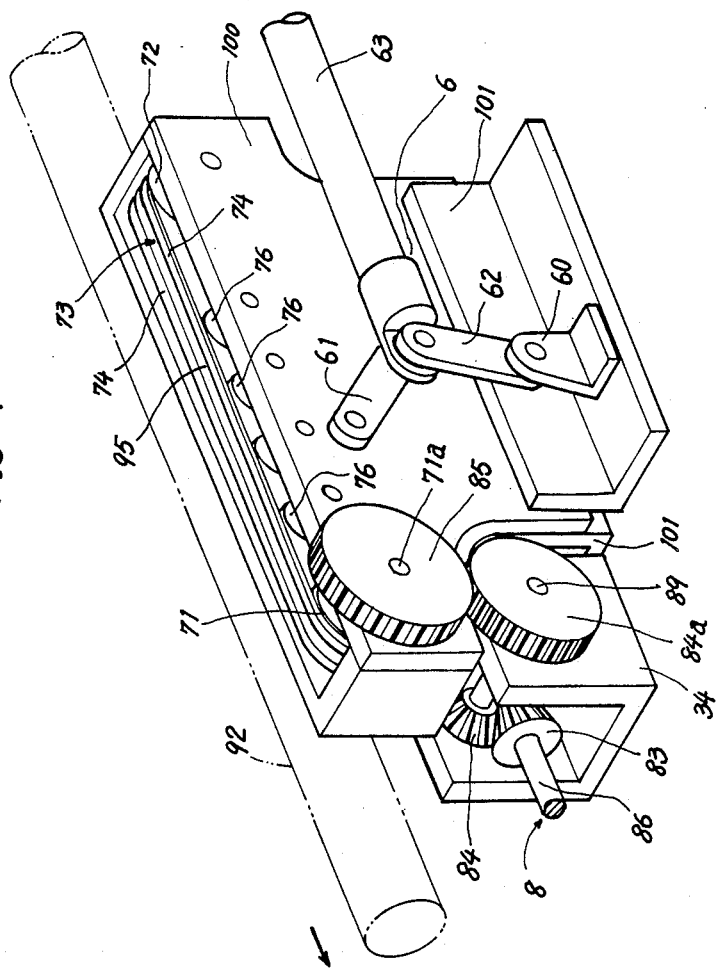
FIG. 4 is a perspective view of the delivery assembly as it is seen from the opposite side of FIG. 3.

With reference to FIGS. 2 and 4, pressing means 6 is connected to an intermediate portion of the support member 100 for pressing the support member against the mandrel 12. The pressing means 6 includes toggle links 61, 62 respectively pivoted to the support member 100 and a bracket 60 mounted on the inner surface of the rotary frame 34, and a push rod 63 disposed in parallel to the mandrel 12 and pivoted to the connection between the two links 61, 62.

The push rod 63 slidably extends through the rear end plate 36 of the rotary frame 34 and is revolvably connected to a cylinder assembly 64 mounted on the boss 33a of the fixed frame 31. The rod 63 is movable forward or rearward. The cylinder assembly 64 comprises a short cylinder 65 secured to the end plate 33 of the fixed frame 31 and surrounding the boss 33a concentrically therewith, and an annular piston 66 slidably provided between the boss 33a and the cylinder 65.

A slidable tubular piston rod 67 fitted around the boss 33a extends from the piston 66 forward beyond the front end of the cylinder 65 and is formed with a circumferential groove 68 at its front end. The push rod 63 is connected to a ring plate 69 rotatably fitted in the groove 68.

A pressure fluid, when supplied to the cylinder assembly 64, advances the piston rod 67, which in turn pushes the push rod 63 forward, causing the toggle links to forcibly press the support members 100 against the mandrel 12.

Owing to the pivotal movement of the parallel link plates 102, 102, each support member 100 approaches the mandrel 12 while slightly advancing axially of the mandrel 12.

The ring plate 69 connecting the push rods 63 to the cylinder assembly 64 is rotatably engaged in the circumferential groove 68 in the piston rod 67 of the assembly 64, so that the push rods 63 are movable around the mandrel 12 with the rotary frame 34 by the rotation of this frame 34 and can also be pushed forward by the piston rod 67.

The paper tapes 91a, 91b wound on the mandrel 12 and brought into the rotary frame 34 are withdrawn therefrom axially of the mandrel 12 by a delivery assembly 7 mounted on each support member 100, in pressing contact with the tapes.

The delivery assembly 7 of the present embodiment comprises a pair of timing pulleys 71, 72 supported respectively at the front and rear ends of the support member 100, and a timing belt 73 endlessly reeved around the two pulleys.

Figure 5:
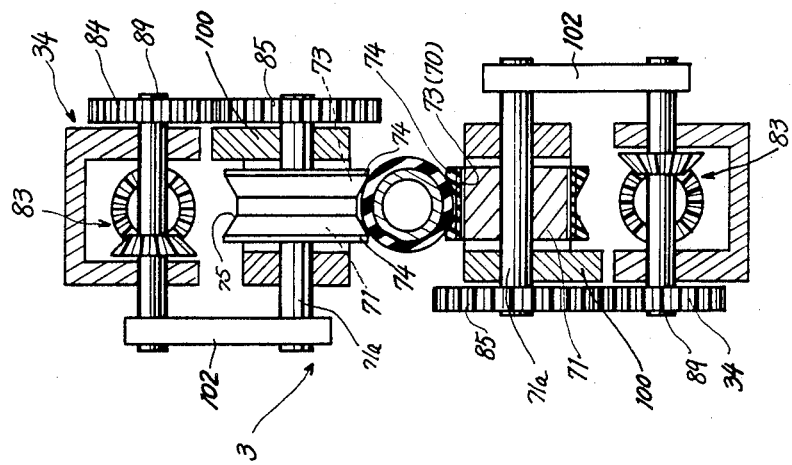
FIG. 5 is a view in section taken along the line V—V in FIG. 2.

With reference to FIG. 5, urethane rubber lips 74, 74 are attached to the outer surface of the timing belt 73 along the respective side edges thereof over the entire circumference of the belt, and a furrow 75 formed between the lips 74, 74 extends over the entire circumference. The timing belt 73 serves as a member for delivering the paper tube axially thereof. A plurality of auxiliary rollers 76 are closely arranged between the two timing pulleys 71, 72 and rotatably mounted on the support member 100. Where the timing belt 73 faces the mandrel 12, the auxiliary rollers 76 are in contact with the rear surface of the belt 73 to guide the belt for straight travel.

Delivery drive means 8 is coupled to the front timing pulley 71 of each delivery assembly 7. The delivery drive means 8 is operatively connected to the rotary drive means 4 via differential speed change means afforded by a planetary gear mechanism.

With reference to FIG. 2, the planetary gear mechanism has a sun gear 81 disposed inside the rotary frame front end plate 35 concentrically with the rotary frame 34 and free to rotate relative to the frame 34. The sun gear 81 has a boss 81a which is rotatably fitted around the boss 35a of the rotary frame 34 with bearings 80 interposed therebetween and which extends outward beyond the boss 35a. A toothed pulley 88 is mounted on the outer end of the boss 81a and coupled to an auxiliary drive unit 87 mounted on the fixed frame 31.

A rotary shaft 86 for a planetary gear 82 is supported on the front end plate 35 of the rotary frame 34, and the planetary gear 82 is in mesh with the sun gear 81. The shaft 86 is coupled at its rear end to an output shaft 89 via bevel gears 83, 84. As seen in FIG. 4, the output shaft 89 is mounted on the rotary frame 34 and intersects the path of movement of the support member 100 at right angles therewith. The shaft 89 carries a gear 84a at one end. The gear 84a is in mesh with a gear 85 mounted on the shaft 71a of the front timing pulley 71 to constitute the delivery drive means 8.

When the rotary frame 34 is rotated with the sun gear 81 at rest, the planetary gear 82 on the frame 34 rotates about its own axis while revolving along the outer periphery of the sun gear 81. The rotation of the planetary gear 82 about its own axis causes the bevel gears 83, 84 and the gears 84a, 85 to rotate the timing pulley 71, which in turn drives the belt 73. With the rotary frame 34 held in rotation in the meantime, each timing belt 73 is thus driven while each delivery assembly 7 is being revolved around the mandrel 12.

When the auxiliary drive unit 87 is operated with the rotary frame 34 held in rotation, the sun gear 81 rotates to control the speed of rotation of the planetary gear 82 about its own axis. Accordingly, the speed of travel of the timing belt 73 is adjustable without changing the speed of rotation of the rotary frame 34.

When required, the paper tube production apparatus of the present invention can be equipped with the tape winding device 2 and/or the tube press 54 upstream from the tube rotating-drawing device 3.

The tape winding device 2 operates to helically wind paper tape on the mandrel 12 into a paper tube and, at the same time, guide the tube to the press 54.

Figure 6:
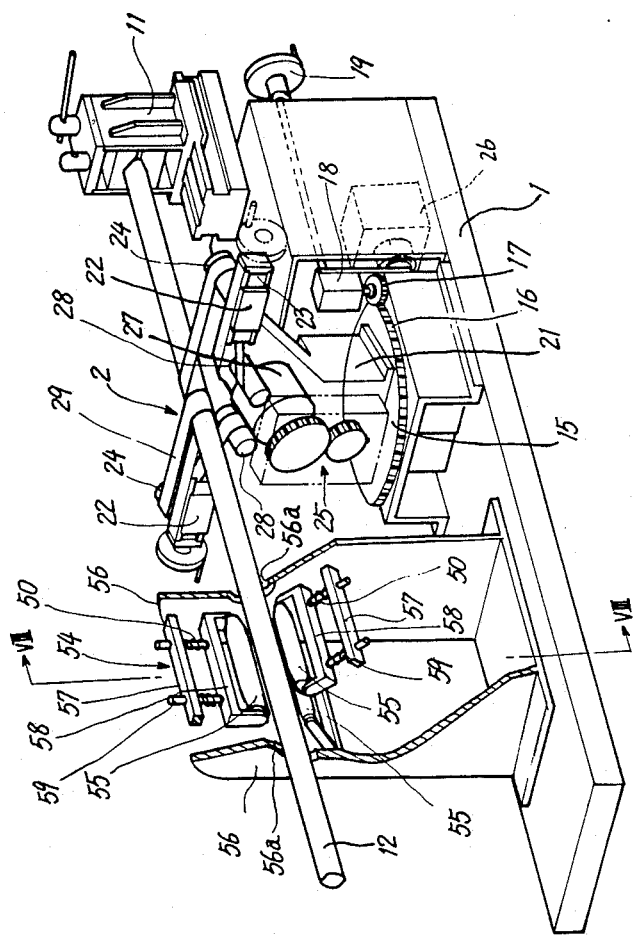
FIG. 6 is a perspective view of a tape winding device and a tube press.
Figure 7:
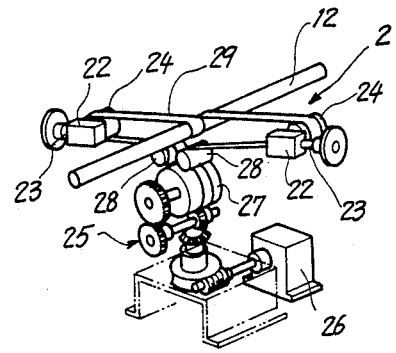
FIG. 7 is a perspective view showing a drive system for the tape winding device.

With reference to FIGS. 6 and 7, the tape winding device 2 includes a belt support 21 on a rotary table 15 which is mounted on the base 1 and rotatable in a horizontal plane. Slide blocks 22, 22 are mounted on opposite ends of the upper portion of the support 21 and are movable toward or away from each other.

A screw rod 23 rotatably supported on each end of the support 21 is screwed through the slide block 22, which is therefore shiftable by the thrust produced by rotating the screw rod 23, whereby the tension on the belt 29 to be described is adjustable. A driven roller 24 is horizontally supported by each block 22. A drive roller 27 having a larger diameter than the driven roller 24 is horizontally mounted on the support 21 centrally of its lower portion. The aforementioned motor 26 is coupled to the drive roller 27 via reduction gear means 25.

Two guide rollers 28, 28 are arranged above and close to the drive roller 27. The belt 29 is wound on the mandrel 12 by one turn and endlessly reeved around the drive roller 27 and the driven rollers 24, 24 over the guide rollers 28, 28.

The outer periphery of the rotary table 15 is locally toothed as indicated at 16, and a gear 17 meshing with the toothed portion 16 is coupled to a manually rotatable handle 19 via a worm 18. The handle 19, when turned, rotates the rotary table 15 and the support 21 to thereby alter the angle at which the belt 29 is wound on the mandrel 12, whereby the angle at which the tape is to be wound is variable as desired in accordance with the tape width.

Figure 12:
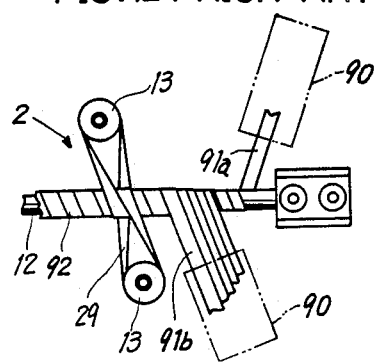
FIG. 12 is a plan view of a conventional tube production apparatus comprising a two-pulley tape winding device.
Figure 13:
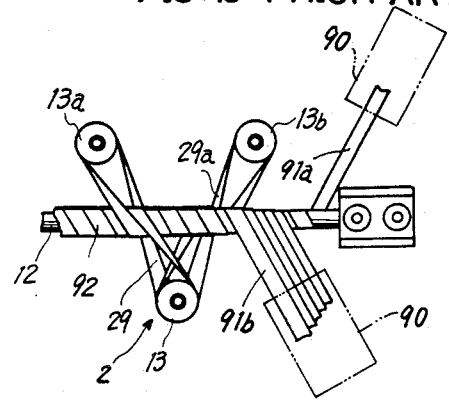
FIG. 13 is a plan view of another conventional tube production apparatus comprising a three-pulley tape winding device.

Although the tape winding device described above is preferable to use, one of the conventional devices shown in FIGS. 12 and 13 is also usable.

Figure 8:
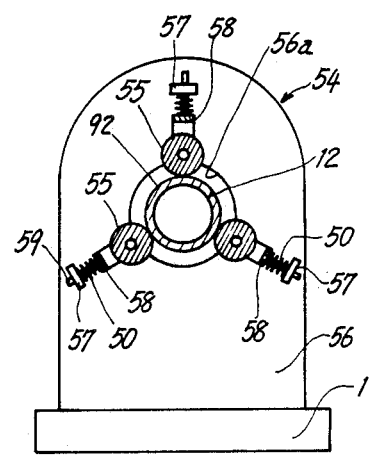
FIG. 8 is a view in section taken along the line VIII—VIII in FIG. 6.

With reference to FIGS. 6 and 8, the tube press 54 comprises two support plates 56, 56 provided upright on the base 1 to intersect the mandrel 12, and three press rollers 55 spaced apart approximately equidistantly around the mandrel 12 inside the support plates 56, 56 and movable toward or away from the axis of the mandrel 12. The support plates 56 are each formed with a hole 56a for passing therethrough the mandrel 12 and the paper tube 92 (not shown in FIG. 6) with a clearance formed around the tube. The support plates 56, 56 are interconnected by stays 57 arranged around the mandrel at equal spacings.

Each press roller 55 is rotatably supported at its opposite ends by a holder 58, which has two parallel rods 59, 59 projecting outward therefrom and slidably extending through the stay 57. A spring 50 is provided around each rod 59 for pressing the press roller 55 against the mandrel 12.

As shown in FIG. 1A and already stated, the tube production apparatus can be provided with one or some of the resin-coated tape feeder 93, resin applicator stand 94, drying oven 95, grinding stand 96 and cutter 97 for cutting the tube 92 to a specified length, as arranged downstream from the apparatus as required.

A tape 91c prepared by coating a nonwoven fabric with a resion solution is supplied to the tube 92 on the mandrel 12 by the applicator 93.

The resin applicator stand 94 is adapted to apply a resin solution onto the resin-coated tape 91c on the paper tube 92 and scrape off an excess of the solution.

The drying oven 95 incorporates a heater (not shown) therein for solidifying the applied resin by drying.

The grinding stand 96 is adapted to grind the resin layer over the tube surface to give a smooth surface finish.

The cutter 97 includes a rotary blade (not shown) rotatable in a plane perpendicular to the paper tube and movable along the mandrel 12 in synchronism with the tube for cutting the tube to the specified length.

The tube production line is operated in the following manner.

First, the support members 100 and the delivery assemblies 7 are held away from the mandrel 12 to leave open the path of travel of paper tape on the mandrel 12.

Paper tape is helically wound on the mandrel 12 by the tape winding device 2 into a paper tube, which is fed to the tube press 54.

While being rotated, the paper tube is pressed against the mandrel 12 by the press rollers 55 of the press 54, whereby the paper tape is tightly wound on the mandrel 12.

The paper tube further advances forward into the tube rotating-drawing device 3.

Upon the egress of the taper tube from the downstream side of the device 3, the rotary drive means 4 for the rotary frame 34, the delivery drive means 8 and the pressing means 6 on the support members 100 are initiated into operation.

With the rotation of the frame 34, the support members 100 and the delivery assemblies 7 revolve around the mandrel 12, while the delivery assemblies 7 on the support members 100 exert great pressure directly on the tube 92 covering the mandrel 12.

The timing belts 73 on the delivery assemblies 7 are also driven, forcing the paper tube 92 forward axially of the mandrel 12.

While the rotary frame 34 is in rotation in a fixed position about the mandrel 12, the delivery assemblies 7 draw the paper tube into the frame 34 axially of the mandrel 12.

Since the torque of the rotary frame 34 and the force of the delivery assemblies 7 in the axial direction of the mandrel 12 act on the paper tube at the same time, the winding device 2 merely assists in winding the tape helically on the mandrel 12 in the current state.

The delivery assemblies 7, which are forcibly pressed toward the axis of the mandrel 12 by the pressing means 6, tightly wind the paper tape on the mandrel 12 while exerting great pressure on the tape, with the result that the paper tube 92 obtained has high pressure resistance.

Since the paper tape is drawn into the rotary frame 34 axially of the mandrel 12 by the delivery assemblies 7 on the frame 34, the speed of production of the tube is dependent on the revolution of the delivery assemblies 7 and can be stabilized per unit time. Consequently, the line incorporating the foregoing devices as associated with the tube production apparatus of the invention is smoothly operable.

In the case where the paper tape is helically wound on the mandrel 12 into a paper tube by the rotating-drawing device 3 only, it is necessary to resort to manual work initially for helically winding the tape on the mandrel into the tube and placing the tube as wound on the mandrel between the timing belts 73 of the device 3 in engagement therewith.

With the rotary frame 34 driven at a constant speed, the speed of transport by the delivery assemblies 7 is variable as desired by operating the auxiliary drive unit 87. This make it possible to transport the paper tape axially of the mandrel at a speed accurately corresponding to the speed at which the tape is wound into the paper tube. Consequently, the tube obtained is free from tape-to-tape clearances.

Because the press rollers 55 of the press 54 are arranged in parallel to the mandrel 12, the friction between the paper tube and the rollers 55 pressing the tube against the mandrel 12 exerts a braking force on the tube against its advance. However, the subsequent rotating-drawing device 3 exerts a great drawing force on the paper tube as already stated, so that the tube is forcibly delivered from the press 54 into the rotating-drawing device 3. This not only eliminates the variations in the tube production speed that could result from an insufficient drawing force on the tube but also makes it possible to accurately determine the tube production speed per unit time, consequently ensuring smooth operation of the line wherein the processing devices are connected to the tube production apparatus downstream thereof as seen in FIG. 1A.

Furthermore, the rotating-drawing device 3 uniformly presses the tube against the mandrel 12 with the timing belts 73 which are opposed to each other diametrically of the mandrel, therefore holds the mandrel straight without warping even if the mandrel has a small diameter to advance the tube smoothly axially of the mandrel, and making it possible to wind up the paper tape into a tube of small diameter at a high speed to achieve a greatly improved production efficiency.

Figure 9:
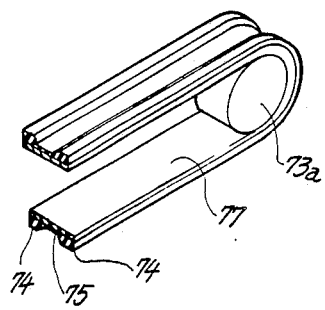
FIG. 9 is a fragmentary perspective view of a flat belt as another example of delivery member.

The timing belt 73 used as the delivery member of the delivery assembly 7 in the foregoing embodiment can be replaced by a flat belt 77 shown in FIG. 9. The belt 77 is reeved around pulleys 73a with a flat rim. It is desirable that like the belt 73, the belt 77 be provided with lips 74, 74 adhered to its outer surface to define a groove 75 between the lips.

Figure 10:
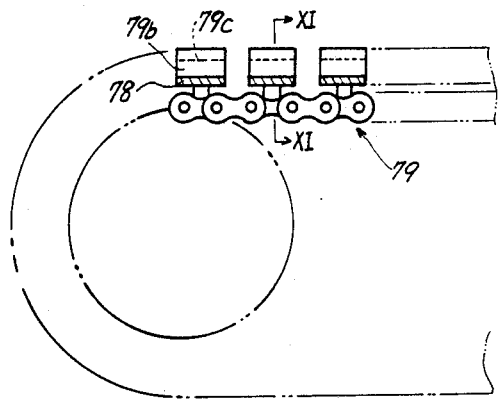
FIG. 10 is a fragmentary front view showing a chain serving as a delivery member.
Figure 11:
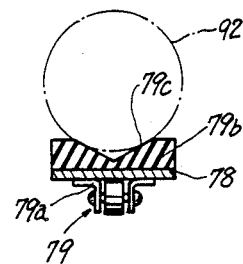
FIG. 11 is a view in section taken along the line XI—XI in FIG. 10.

In place of the timing belt 73, a chain 79 is also usable as shown in FIGS. 10 and 11. Each of the links of the chain 79 is provided with a mount 78 having attached thereto a rubber tread 79b with a V-groove 79c. The paper tube is brought into contact with the grooved side of the tread.

According to the present invention, the paper tube need not always be forwarded by driving the timing belt, the flat belt or the chain with the treads, but the rollers 71, 72 and 76 can be in direct pressing contact with the paper tube to deliver the tube axially of the mandrel by the rotation of the rollers. In this case, it is desirable to form the outer peripheral portion of each roller by a material, such as urethane rubber, having a great coefficient of friction, with a circumferential groove formed in the periphery of the roller, to increase the area of contact between the roller and the paper tube.

The tube production line shown in FIG. 1A can be so positioned that the mandrel 12 extends vertically from above for producing the tube 92. In this case, the mandrel needs only to be supported at its upper end so as to extend downward and can therefore be supported by simplified lightweight means unlike the conventional arrangement wherein the mandrel is supported at its base end and positioned horizontally.

The vertical line, although necessitating a higher ceiling for the factory, can be installed in a greatly reduced space unlike the conventional production line. Additionally, the component devices required for the tube production line can be installed horizontally on different floors of the factory, therefore need not be positioned at a definite level and can be installed easily. The frames for the devices can be small-sized to compact the entire line, hence a reduced equipment cost.

It is further possible to provide a plurality of tube production lines vertically side by side and to transmit power to the individual lines through a coutershaft interconnecting the lines. Thus, all the tube production lines can be operated by one motor for driving the countershaft.

Various modifications can be made by one skilled in the art without departing from the scope of the invention as defined in the appended claims.

What is claimed is:

1. An apparatus for producing a tube comprising:
   (a) a straight mandrel supported at one end thereof by a base, for helically winding tape thereon,
   (b) tape feed means for feeding the tape to the mandrel in an oblique direction to helically wind the tape on the mandrel into a tubular form to make the tube,
   (c) a tube rotating-drawing device for delivering the tube from the mandrel axially thereof, the tube rotating-drawing device comprising:
      (i) a fixed frame mounted on the base,
      (ii) a rotary frame rotatably supported by the fixed frame,
      (iii) rotary drive means coupled to the rotary frame for rotating the rotary frame around said mandrel,
      (iv) support members disposed on the rotary frame such that said mandrel is interposed therebetween, each of the support members being movable toward and away from the mandrel,
      (v) pressing means, connected to each of the support members, for controlling the support members to apply a force acting toward the mandrel,
      (vi) delivery assembly means, each associated with a said support member, for withdrawing the tube longitudinally of the mandrel and being in pressing contact with the tube, each of the delivery assembly means having a pair of wheels supported at front and rear end portions of the respective support member, respectively, and a delivery member in the form of endless belt means, extending around the wheels, for making contact with the tube on the mandrel over a specified length between the two wheels, and
      (vii) delivery drive means, coupled to each of the delivery assembly means at one of the wheels thereof, for forcing the respectively delivery member in a downstream direction while said delivery member rotates around the mandrel and frictionally contacts the tube,
   (d) a tape winding device interposed between the tape feed means and the tube rotating-drawing device and having a belt, the belt extending along an endless path and being wound on the mandrel to intersect the mandrel obliquely, the belt being movable along its path to thereby helically wind the tape around the mandrel into the tube, and
   (e) a tube press interposed between the tape winding device and the tube rotating-drawing device, the tube press having a plurality of press rollers movable toward or away from the mandrel and biased toward the axis of the mandrel for pressing the tube on the mandrel thereagainst.

2. An apparatus as defined in claim 1 wherein the rotary frame has an inner surface having secured thereto a pair of guide plates, and each support member is slidably held between the guide plates and is movable toward or away from the mandrel.

3. An apparatus as defined in claim 1 wherein a tube cutter is disposed downstream from the tube rotating-drawing device.

4. An apparatus as defined in claim 1 wherein the tape is paper tape.

5. An apparatus according to claim 1 wherein said delivery drive means includes means for moving said belt means at a speed independent of the speed of rotation of said rotary frame about said fixed frame.

6. An apparatus for producing a tube comprising:
   (a) a straight mandrel supported at one end thereof by a base, for helically winding tape thereon,
   (b) tape feed means for feeding the tape to the mandrel in an oblique direction to helically wind the tape on the mandrel into a tubular form to make the tube,
   (c) a tube rotating-drawing device for delivering the tube from the mandrel axially thereof, the tube rotating-drawing device comprising:
      (i) a fixed frame mounted on the base,
      (ii) a rotary frame rotatably supported by the fixed frame,
      (iii) rotary drive means coupled to the rotary frame for rotating the rotary frame around said mandrel,
      (iv) support members disposed on the rotary frame such that said mandrel is interposed therebetween, each of the support members being movable toward and away from the mandrel,
      (v) pressing means, connected to each of the support members, for controlling the support members to apply a force acting toward the mandrel,
      (vi) delivery assembly means, each associated with a said support member, for withdrawing the tube longitudinally of the mandrel and being in pressing contact with the tube, each of the delivery assembly means having a pair of wheels supported at front and rear end portions of the respective support member, respectively, and a delivery member in the form of endless belt means, extending around the wheels, for making contact with the tube on the mandrel over a specified length between the two wheels, (vii) delivery drive means, coupled to each of the delivery assembly means at one of the wheel thereof, for forcing the respective delivery member in a downstream direction while said delivery member rotates around the mandrel and frictionally contacts the tube, and (d) a resin-coated tape feeder, a resin applicator stand, a drying oven and a grinding stand arranged downstream from the tube rotating-drawing device.

7. An apparatus as defined in claim 6 wherein a tube cutter is disposed downstream from the grinding stand.

8. An apparatus for producing a tube comprising:

(a) a straight mandrel supported at one end thereof by a base, for helically winding tape thereon, (b) tape feed means for feeding the tape to the mandrel in an oblique direction to helically wind the tape on the mandrel into a tubular form to make the tube, and (c) a tube rotating-drawing device for delivering the tube from the mandrel axially thereof, the tube rotating-drawing device comprising:

(i) a fixed frame mounted on the base, (ii) a rotary frame rotatably supported by the fixed frame, (iii) rotary drive means coupled to the rotary frame for rotating the rotary frame around said mandrel, (iv) support members disposed on the rotary frame such that said mandrel is interposed therebetween, each of the support members being movable toward and away from the mandrel, (v) pressing means, connected to each of the support members, for controlling the support members to apply a force acting toward the mandrel, (vi) delivery assembly means, each associated with a said support member, for withdrawing the tube longitudinally of the mandrel and being in pressing contact with the tube, each of the delivery assembly means having a pair of wheels supported at front and rear end portions of the respective support member, respectively, each said wheel means being constituted by a pulley, a delivery member in the form of endless belt means, extending around the wheels, for making contact with the tube on the mandrel over a specified length between the two wheels, and a plurality of auxiliary rollers spaced between the pulleys and rotatably mounted on the support member, the auxiliary rollers being adapted to be in contact with a rear surface of the belt means so as to guide the belt means for straight travel, and (vi) delivery drive means, coupled to each of the delivery assembly means at one of the wheels thereof, for forcing the respective delivery member in a downstream direction while said delivery member rotates around the mandrel and frictionally contacts the tube.

9. An apparatus for producing a tube comprising:

(a) a straight mandrel supported at one end thereof by a base, for helically winding tape thereon, (b) tape feed means for feeding the tape to the mandrel in an oblique direction to helically wind the tape on the mandrel into a tubular form to make the tube, and (c) a tube rotating-drawing device for delivering the tube from the mandrel axially thereof, the tube rotating-drawing device comprising:

(i) a fixed frame mounted on the base, (ii) a rotary frame rotatably supported by the fixed frame, (iii) rotary drive means coupled to the rotary frame for rotating the rotary frame around said mandrel, (iv) support members disposed on the rotary frame such that said mandrel is interposed therebetween, each of the support members being movable toward and away from the mandrel, (v) pressing means, connected to each of the support members, for controlling the support members to apply a force acting toward the mandrel, (vi) delivery assembly means, each associated with a said support member, for withdrawing the tube longitudinally of the mandrel and being in pressing contact with the tube, each of the delivery assembly means having a pair of wheels supported at front and rear end portions of the respective support member, respectively, each said wheel means being constituted by a sprocket, and a delivery member in the form of endless belt means, extending around the wheels, for making contact with the tube on the mandrel over a specified length between the two wheels, said belt means including an endless chain extending around the sprockets and having a plurality of links, a plurality of mount means attached to at least some of the links, and a resilient tread member attached to each said mount means, and (vii) delivery drive means, coupled to each of the delivery assembly means at one of the wheels thereof, for forcing the respective delivery member in a downstream direction while said delivery member rotates around the mandrel and frictionally contacts the tube.

10. An apparatus for producing a tube comprising:

(a) a straight mandrel supported at one end thereof by a base, for helically winding tape thereon, (b) tape feed means for feeding the tape to the mandrel in an oblique direction to helically wind the tape on the mandrel into a tubular form to make the tube, and (c) a tube rotating-drawing device for delivering the tube from the mandrel axially thereof, the tube rotating-drawing device comprising:

(i) a fixed frame mounted on the base, (ii) a rotary frame rotatably supported by the fixed frame, (iii) rotary drive means coupled to the rotary frame for rotating the rotary frame around said mandrel, (iv) support members disposed on the rotary frame such that said mandrel is interposed therebetween, each of the support members being movable toward and away from the mandrel, (v) pressing means, connected to each of the support members, for controlling the support members to apply a force acting toward the mandrel, (vi) delivery assembly means, each associated with a said support member, for withdrawing the tube longitudinally of the mandrel and being in pressing contact with the tube, each of the delivery assembly means having a pair of wheels supported at front and rear end portions of the respective support member, respectively, and a delivery member in the form of endless belt means, extending around the wheels, for making contact with the tube on the mandrel over a specified length between the two wheels, and (vii) delivery drive means, coupled to each of the delivery assembly means at one of the wheels thereof, for forcing the respective delivery member in a downstream direction while said delivery member rotates around the mandrel and frictionally contacts the tube, said delivery drive means including:

(A) a sun gear having a boss disposed concentrically with the rotary frame and rotatable freely relative to the rotary frame,
(B) a toothed pulley mounted on an outer end of the boss,
(C) an auxiliary drive unit mounted on the fixed frame and drivingly associated with the toothed pulley,
(D) planetary gears engaging with the sun gear, each of the planetary gears having a rotary shaft,
(E) bevel gears mounted on a rear end portion of the rotary shaft, and
(F) output shafts, each of the output shafts mounted on the rotary frame and intersecting the path of movement of the support member at substantially right angles therewith, the output shafts being associated with the rotary shafts on the planetary gear and with one of the wheels of the delivery assembly means.

* * * * *